United States Patent
Kami

(10) Patent No.: US 9,530,081 B2
(45) Date of Patent: Dec. 27, 2016

(54) SIMILARITY DETECTING APPARATUS AND DIRECTIONAL NEAREST NEIGHBOR DETECTING METHOD

(71) Applicant: Nobuharu Kami, Tokyo (JP)

(72) Inventor: Nobuharu Kami, Tokyo (JP)

(73) Assignee: NEC Corporation, Tokyo (JP)

( * ) Notice: Subject to any disclaimer, the term of this patent is extended or adjusted under 35 U.S.C. 154(b) by 177 days.

(21) Appl. No.: 14/348,951

(22) PCT Filed: Oct. 3, 2012

(86) PCT No.: PCT/JP2012/075673
§ 371 (c)(1),
(2) Date: Apr. 1, 2014

(87) PCT Pub. No.: WO2013/051619
PCT Pub. Date: Apr. 11, 2013

(65) Prior Publication Data
US 2014/0324870 A1    Oct. 30, 2014

(30) Foreign Application Priority Data
Oct. 3, 2011  (JP) ................. 2011-219547

(51) Int. Cl.
*G06F 17/30* (2006.01)
*G06K 9/62* (2006.01)

(52) U.S. Cl.
CPC ....... *G06K 9/6276* (2013.01); *G06F 17/30247* (2013.01); *G06F 17/30528* (2013.01);
(Continued)

(58) Field of Classification Search
CPC ............ G06F 17/30247; G06K 9/6215; G06K 9/6276
See application file for complete search history.

(56) References Cited

U.S. PATENT DOCUMENTS

| | | |
|---|---|---|
| 2004/0139067 A1 | 7/2004 | Houle |
| 2006/0153457 A1 | 7/2006 | Nakamura et al. |

FOREIGN PATENT DOCUMENTS

| | | |
|---|---|---|
| JP | H10-326286 A | 12/1998 |
| JP | 2000-112973 A | 4/2000 |

(Continued)

OTHER PUBLICATIONS

Ahmed, Yousuf Shamim. Multiple Random Pro0ection for Fast, Approximate Nearest Neighbor Search in High Dimensions. Diss. University of Toronto, 2004.*

(Continued)

*Primary Examiner* — William Spieler
(74) *Attorney, Agent, or Firm* — Wilmer Cutler Pickering Hale and Dorr LLP

(57) ABSTRACT

In order to detect similar data from a great deal of data at high speed, a similarity detecting apparatus includes a random number generating unit 3 which calculates random number data based on a parameter list, a table managing unit 5 which calculates a plurality of key calculation functions based on the random number data, calculates a plurality of tables based on input data, and calculates a candidate data list based on a query shown by a search condition, and a data processing unit 6 which calculates search result data from the candidacy data list to satisfy the condition shown a search condition. Each table is calculated for a value corresponding to a key to show a data list of data in which the data substituted into a key calculation function is equal to the key. A candidate data list contains a plurality of search data list and a search data list corresponding to the table shows the value corresponding to a query value obtained by substituting the query into the key calculation function.

9 Claims, 14 Drawing Sheets

(52) U.S. Cl.
CPC ......... *G06F 17/30598* (2013.01); *G06K 9/62* (2013.01); *G06K 9/6215* (2013.01); *G06K 9/6232* (2013.01); *G06K 9/6268* (2013.01)

(56) References Cited

FOREIGN PATENT DOCUMENTS

| | | |
|---|---|---|
| JP | 2003-157283 A | 5/2003 |
| JP | 2004-021430 A | 1/2004 |
| JP | 2004-199472 A | 7/2004 |
| JP | 2005-070927 A | 3/2005 |
| JP | 2006-190191 A | 7/2006 |
| JP | 2009-116592 A | 5/2009 |

OTHER PUBLICATIONS

International Search Report corresponding to PCT/JP2012/075673 dated Dec. 25, 2012 (2 pages).
M. Datar, et al., "Locality Sensitive Hashing Scheme Based on P-Stable Distributions," In Proceedings of the ACM Symposium on Computational Geometry, 2004, pp. 253-262.
International Preliminary Report on Patentability issued by the International Bureau of WIPO for International Application No. PCT/JP2012/075673 mailed Apr. 8, 2014 (5 pgs.).
Extended European Search Report issued by the European Patent Office for Application No. 12838222.3 dated Mar. 31, 2016 (8 pages).
Marinho, E. P. and Andreazza, C. M., "Anisotropic K-Nearest Neighbor Search Using Covariance Quadtree," Cornell University Library, Ithaca, N.Y., XP080523910, 20 pages (Aug. 31, 2011).

\* cited by examiner

| DIRECTIONAL PARAMETER | DIRECTION V | INTENSITY σ |
|---|---|---|
| $u_1$ | $(1/\sqrt{2}, 1/\sqrt{2})$ | 2 |
| $u_2$ | $(-1/\sqrt{2}, 1/\sqrt{2})$ | 1 |

SIMILARITY DETECTING APPARATUS AND DIRECTIONAL NEAREST NEIGHBOR DETECTING METHOD

CROSS-REFERENCE TO RELATED APPLICATIONS

This application is a national stage application of International Application No. PCT/JP2012/075673, entitled "Similarity Detecting Apparatus and Directional Nearest Neighbor Detecting Method," filed on Oct. 3, 2012, which claims the benefit of the priority of Japanese patent application No. 2011-219547, filed on Oct. 3, 2011, the disclosures of each of which are hereby incorporated by reference in their entirety.

TECHNICAL FIELD

The present invention relates to a feature detecting apparatus and a directional nearest neighbor detecting method, and more particularly relates to a feature detecting apparatus for searching desirable data from a multi-dimensional continuous data set and a directional nearest neighbor detecting method.

BACKGROUND ART

A nearest neighbor searching technique is an important technique that is used in various application fields. For example, the nearest neighbor searching technique is used in an application field in which data having similar features are detected from an enormous database in consideration of the similarity of data such as an image and a Web page. As a very simple method, the feature of each data is represented as one point in a space (for example, one point in a Euclidean space), in which a distance is defined, and the distances from a query point to all the data are calculated. Thus, the data near to the query can be detected. However, a method of directly calculating the distances requires a very expensive cost, and as the number of the data increases, a calculation load is nonlinearly increased. Thus, various methods have been proposed.

Patent Literature 1 (JP 2004-021430A) discloses an image searching apparatus that can accurately search an image, which includes an image of a particular photographic subject, as a similar image without any cumbersome operation of a user. The image searching apparatus extracts the image similar to a reference image serving as a search key, from among a search target image group that includes a plurality of images targeted for a search. The image searching apparatus includes: a section for dividing the reference image and the respective images included in the search target image group into a plurality of regions; a section for extracting at least one feature amount from the each of the regions of each of the images included in the search target image group and the reference image; and a section for selecting a part of the region for each image included in the search target image group, and sequentially selecting the images from the search target image group, and selecting a predetermined number of regions of the selected image based on a similarity between a feature amount extracted from each of the regions of the reference image and a feature amount extracted from each region of the selected image; and a section for extracting the image similar to the reference image from the search target image group, based on the feature amount of a partial region selected for each image included in the search target image group.

Patent Literature 2 (JP 2005-070927A) discloses an image feature acquiring method that acquires an image feature, by which an image similar to a drawn shape can be detected, irrespective of a coincident degree of images. The image feature acquiring method is a method that acquires an image feature of a two-dimensional image. The two-dimensional image is changed to a predetermined size, and if the image is a color image, the image is converted into a scale image in grayscale. Then, one-dimensional raster image in a horizontal direction is generated by sequentially connecting an end point of a sequence of pixels connected in the horizontal direction from a start point which is set in one of a right side and a left side of the two-dimensional image, and a start point of a next sequence of pixels in a vertical direction in each scale image, and one-dimensional raster image in the vertical direction is generated by sequentially connecting an end point of a sequence of pixels connected in the vertical direction from a start point which is set in one of a right side and a left side of the two-dimensional image, and a start point of a next sequence of pixels in a horizontal direction in each scale image. A proper conversion processing is carried out to these one-dimensional raster images.

Patent Literature 3 (JP H10-326286A) discloses a similarity searching apparatus in which the precision of a similarity search can be improved and there is a low possibility that an important similarity data is removed from a search result. The similarity searching apparatus is characterized by including: a vector database for accumulating a plurality of vector data which are generated for plurality of targets, and in which a plurality of attributes for indicating the features of the targets serve as vector configuration elements; a target vector data generating section for generating vector data for a specified similarity search target; a search condition set generating section for generating a plurality of search conditions; a similarity searching engine for searching vector data, which satisfies the above search conditions and is similar to the above target vector data, from the plurality of vector data accumulated in the above vector database, for each individual search condition generated by this search condition set generating section; and a search result display for displaying a result searched by the above similarity searching engine for each individual search condition.

Typically, in the nearest neighbor search in a higher-dimensional space, a problem becomes further difficult, as compared with a lower-dimensional space. For this reason, an approximate nearest neighbor search method is proposed in which nearest neighbor data is not determined through strict distance calculation for enormous higher-dimensional data, and data in a near distance is determined approximately or probabilistically. One typical example is LSH (Locality Sensitive Hashing) (refer to Non-Patent Literature 1). The LSH is a method that uses a hash function in which as a distance between optional two points is closer, they collide at a high probability (have a same value), and it is possible to reduce a time required for a nearest neighbor detection to a query input. Here, when the LSH is used, a probability at which data p collides with a query q is based on only the distance $d(p,q)$. Thus, all of a plurality of data located on a circumference of a circle having the query q as a center collide with the query q at a same probability.

CITATION LIST

[Patent Literature 1]: JP 2004-021430A
[Patent Literature 2]: JP 2005-070927A
[Patent Literature 3]: JP H10-326286A

[Non-Patent Literature 1]: Datar, M., Immorlica, N., Indyk, P., and Mirrokni, V. 2004. "Locality sensitive hashing scheme based on p-stable distributions", (In proceedings of the ACM Symposium on Computational Geometry)

SUMMARY OF THE INVENTION

A first problem is in that a detailed position relation which is represented by a direction is not considered as an index of an approximation of features of two data. Specifically, the nearest neighbor search cannot be carried out by distinguishing a difference in direction, as in a case that a weight is given heavier to a distance in a direction than a distance in another direction. The reason is in that a technique depending on only the distance is used in a conventional nearest neighbor search.

A second problem is in that an unnecessary calculation time is required in the conventional technique, when there is an interest to the similarity in only an aspect. In the conventional technique, this is because the direction is not considered, so that the process of 2 steps of extracting candidates by the nearest neighbor detection in all the directions, and of taking out only data along an interested direction is required. Because the number of candidates detected in the nearest neighbor becomes enormous as a difference of the strength of the interest is larger in dependence on the direction (when a difference in the weight of distance between a direction and another direction is very large), the reduction effect of the calculation time cannot be expected too much.

An object of the present invention is to provide a similarity detecting apparatus and a directional nearest neighbor detection method, in which in a nearest neighbor detection in a space that a difference of a feature is defined as a distance, a nearest neighbor data can be detected at a high speed by specifying an optional similarity criterion (an optional direction and an importance of an optional distance).

The similarity detecting apparatus according to the present invention is composed of a random number generating section, an initializing section, a data registering section, a searching section and a data processing section. The random number generating section calculates a plurality of random number data based on a plurality of directional parameters and a plurality of intensity parameters which are inputted through an input unit. A plurality of directional parameter shows a direction on the Euclidean space. The initializing section calculates a plurality of key calculation functions based on the plurality of random number data. The data registering section calculates a plurality of tables corresponding to the plurality of key calculation functions based on a plurality of search target data inputted through the input unit and records the plurality of tables in a table holding unit. The plurality of search object data shows points on the Euclidean space respectively. A distance between two points shown by optional two of the plurality of search object data shows a similarity of the two search object data. One of the plurality of tables corresponding to an optional key calculation function relates a plurality of keys to a plurality of data lists, and is calculated such that a value calculated by substituting data belonging to one of a plurality of data lists which corresponds to an optional key into the optional key calculation function is equal to the optional key. The searching section refers to the plurality of tables to calculate a candidate data list based on a query showing the search condition inputted through the input unit shows. The candidate data list contains the plurality of search data lists corresponding to the plurality of key calculation functions. One of the plurality of search data lists corresponding to the optional key calculation function shows a data list corresponding to a query value calculated by substituting the query into the key calculation function. The data processing section calculates search resultant data from a plurality of search data belonging to the candidate data list so as to satisfy a condition shown by the search condition, and outputs the search resultant data to an output unit.

In a method of directional nearest neighbor detection according to the present invention, a plurality of random number data are calculated based on a plurality of directional parameters and a plurality of intensity parameters which are inputted through an input unit. Also, a plurality of key calculation functions are calculated based on the plurality of random number data. Also, a plurality of tables corresponding to the plurality of key calculation functions are calculated based on a plurality of search target data inputted through the input unit. Also, the plurality of tables are registered on a table holding unit. Also, the plurality of tables are referred to calculate a candidate data list based on a query shown by a search condition inputted through the input unit. Also, a search resultant data is calculated from a plurality of search data belonging to the candidate data list so as to satisfy a condition shown by the search condition. Also, the search result data is outputted to an output unit. A plurality of directional parameters show directions on the Euclidean space. The plurality of search object data show points on the Euclidean space, respectively. A distance between two points shown optional two of the plurality of search object data shows a similarity of the optional two search object data. One of the plurality of tables which corresponds to the optional key calculation function is calculated, by relating the plurality of keys to the plurality of data lists, such that a value calculated by substituting data belonging to one of the plurality of data lists which corresponds to the optional key into the optional key calculation function is equal to the optional key. The candidate data list includes a plurality of search data lists corresponding to the plurality of key calculation functions. One of the plurality of search data lists corresponding to the optional key calculation function shows one of the plurality of data lists corresponding to a query value calculated by substituting the query into the key calculation function.

A first effect is in that it is possible to carry out the detection of a nearest neighbor point with high degrees of freedom along an interested direction from a query point to enormous data. The reason is because a directional nearest neighbor detection function can be realized by providing a data management function having a table in which data is registered on a same entry in a high probability as a distance between optional two points is shorter when the distance is measured in an optional distance weight (importance) along the interested direction.

A second effect is in the speeding-up of the directional nearest neighbor search process. The reason is in that it is enough to handle only data registered on a same entry as a query point by registering data on a plurality of tables in which a desired directivity is registered, so that online processing time can be substantially reduced because it is not necessary to calculate distances to all the data.

DESCRIPTION OF EXEMPLARY EMBODIMENTS

Figure 1:
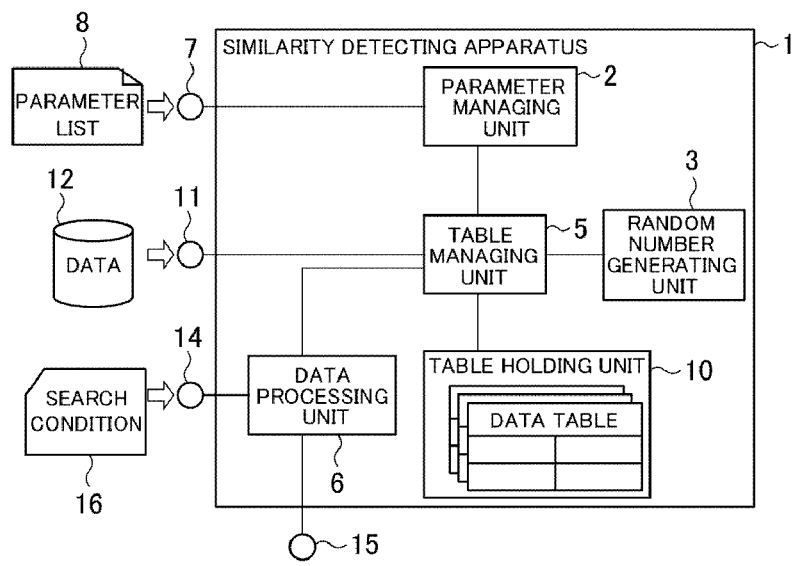
FIG. 1 is a block diagram showing a similarity detecting apparatus according to the present invention.

Hereinafter, a similarity detecting apparatus according to exemplary embodiments of the present invention will be described with reference to the attached drawings. In the similarity detecting apparatus 1, a plurality of computers are connected so that the computers can transmit data bi-directionally, as shown in FIG. 1.

Each of the plurality of computers contains a CPU, a storage unit and an interface, although they are not shown.

The CPU executes a computer program installed in the computer to control the storage unit and the interface.

The storage unit stores the computer program and tentatively records or stores data generated by the CPU.

The interface outputs data generated by an external unit connected to the computer, to the CPU, or outputs the data generated by the CPU to the external unit.

As the external unit, an input unit, an output unit, a communication unit and a removable memory drive are exemplified.

The input unit generates data through an operation of a user and outputs the data to the CPU. As the input unit, a keyboard, a pointing device and a touch panel are exemplified.

The output unit outputs data generated by the CPU to be able to be recognized by the user. As the output unit, a display, an acoustic device and a touch panel are exemplified.

The communication unit transmits data generated by the CPU through a communication network to another computer and outputs data received from the other computer through the communication network to the CPU. The communication unit is further used to download a computer program from the other computer.

When a recording medium is inserted into the removable memory drive, the removable memory drive is used to read data stored in the recording medium. When the recording medium in which the computer program has been stored is inserted into the removable memory drive, the removable memory drive is further used when the computer program is to be installed in the computer. As the recording medium, a magnetic disc (a flexible disc, a hard disc), an optical disc (CD, DVD), a magnetic-optical disc and a flash memory are exemplified.

A parameter managing unit 2, a random number generating unit 3, a table managing unit 5 and a data processing unit 6 are contained in the plurality of computers.

The parameter managing unit 2 contains an input unit 7. The parameter managing unit 2 controls the input unit 7 so that a parameter list 8 is inputted through the input unit 7 to the parameter managing unit 2.

When a random number data is requested by the table managing unit 5, the random number generating unit 3 calculates random number data based on data outputted by the table managing unit 5.

The table managing unit 5 contains a table holding unit 10 and an input unit 11. The table managing unit 5 controls the input unit 11 so that input data 12 is inputted through the input unit 11 to the table managing unit 5. The table managing unit 5 calculates a plurality of tables based on the input data 12 and the random number data calculated by the random number generating unit 3. The table managing unit 5 controls the table holding unit 10 so that the plurality of tables are stored in the table holding unit 10. Moreover, when a data list is requested by the data processing unit 6, the table managing unit 5 refers to the plurality of tables to calculate the data list based on the data outputted by the data processing unit 6, and then outputs the data list to the data processing unit 6.

The data processing unit 6 contains an input unit 14 and an output unit 15. The data processing unit 6 controls the input unit 14 so that a search condition 16 is inputted through the input unit 14 to the data processing unit 6. The search condition 16 includes a query and a condition. The data processing unit 6 further outputs the query to the table managing unit 5 to request the data list from the table managing unit 5. The data processing unit 6 calculates search resultant data based on the condition and the data list calculated by the table managing unit 5. The search resultant data indicates data, which satisfies the condition, in the data indicated by the data list. The data processing unit 6 further controls the output unit 15 so that the search resultant data calculated by the table managing unit 5 is output to be able to be recognized by the user.

Figure 2:
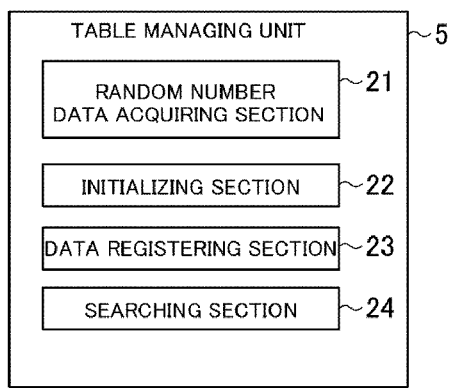
FIG. 2 is a block diagram showing a table managing unit.

FIG. 2 shows the table managing unit 5. The computer program that has been installed in the table managing unit 5 is provided with a plurality of sub computer programs to make the table managing unit 5 realize a plurality of functions.

When each of the plurality of functions is realized by the table managing unit 5, the table managing unit 5 includes a random number data acquiring section 21, an initializing section 22, a data registering section 23 and a searching section 24.

The random number data acquiring section 21 collects the parameter list 8, which is inputted to the parameter managing unit 2, from the parameter managing unit 2. The parameter list 8 indicates a table parameter, a management parameter and a directional parameter. The table parameter indicates a number of planes P, a window width W, a cardinal number C and a bit length B. The number of planes P indicates a positive integer. The window width W indicates a positive real number. The cardinal number C indicates an integer of 2 or more. The bit length B is a positive integer. The management parameter indicates the number of dimensions D. The directional parameter indicates a set U.

The set U is composed of directional parameter $u_j$ and represented by the following equation.

$$U=\{u_j | u_j \epsilon R^D \cdot R_+\} \; (j=1, \ldots, D)$$

Here, a set $R^D$ indicates a D-dimensional vector space. For example, a set $R^2$ indicates a two-dimensional vector space.

A set $R_+$ indicates a set of positive real numbers. That is, the directional parameter $u_j$ is represented by the following equation.

$$u_j = <v_j, \sigma_j>$$

Here, a directional parameter $v_j$ indicates a D-dimensional vector. An intensity parameter $\sigma_L$ is a positive real number and indicates a degree at which importance is put on the directional parameter $v_j$.

The random number data acquiring section 21 outputs the window width W, the bit length B, the dimension number D and the set U in the parameter list 8 to the random number generating unit 3 to request the random number data to the random number generating unit 3. The random number data acquiring section 21 collects the random number data, which has been calculated by the random number generating unit 3, from the random number generating unit 3. The random number data acquiring section 21 repeats the request P times to collect a plurality of (P) random number data from the random number generating unit 3 and then to generate a random number data set Z.

The random number data set Z is represented by the following equation:

$$Z=\{Z_p\} \; (p=1, \ldots, P)$$

Here, the set $Z_p$ indicates one random number data calculated by the random number generating unit 3.

The set $Z_p$ is represented by the following equation:

$$Z_p = \{Z_b | Z_b = <\bullet^{(p)}{}_b, R^{(p)}{}_b>\} \; (b=1, \ldots, B)$$

Here, a random number $R^{(p)}{}_b$ indicates a random number that is subjected to a uniform distribution U[O, W]. A random vector $\bullet^{(p)}{}_b$ indicates a D-dimensional vector.

The random vector $\bullet^{(p)}{}_b$ is represented by the following equation:

$$\bullet^{(p)}{}_b = V^{-1/2} A_b$$

A matrix V is represented by the following equation:

$$V=(v_1, \ldots, v_D)$$

A diagonal matrix $\bullet^{-1/2}$ is represented by the following equation:

$$\bullet^{-1/2} = \mathrm{diag}\{1/\bullet_1, \ldots, 1/\bullet_D\}$$

A vector $A_b$ is a D-dimensional vector, and a d-component $A_{b,d}$ (d=1, ..., D) of the vector $A_b$ indicates a random number that is subject to a normal distribution N(0, 1).

The initializing section 22 further calculates a plurality of (P) key calculation functions based on the parameter list 8, which is collected by the parameter managing unit 2, and the random number data which is collected by the random number data acquiring section 21. Of the plurality of key calculation functions, a key calculation function $L^{(p)}(x)$ corresponding to an optional natural number p (p·P) is a function of a D-dimensional vector x.

The key calculation function $L^{(p)}(x)$ is represented by the following equation, by using the D-dimensional vector x:

$$L^{(p)}(x) = (f^{(p)}{}_1(x), \ldots, f^{(p)}{}_B(x))$$

A basic function $f^{(p)}{}_b(x)$ is represented by the following equation:

$$f_b^{(p)}(x) = \left[\frac{\Phi_b^{(p)} \cdot x + R_b^{(p)}}{W}\right] \mathrm{mod}\, C$$

The data registering section 23 controls the input unit 11 so that the input data 12 is received through the input unit 11 by the table managing unit 5. The input data 12 indicates a data set X.

The data set X is composed of data $x_i$ and represented by the following equation:

$$X=\{x_i | x_i \epsilon R^D\} \; (i=1, \ldots, N)$$

Here, the set $R^D$ indicates the D-dimensional vector space. A natural number N indicates the total number of elements of the data $x_i$ of the data set X and indicates a natural number greater than "1". The data $x_i$ indicates the D-dimensional vector.

The data registering section 23 further generates a plurality of (P) tables based on the input data 12 and the plurality of key calculation functions calculated by the initializing section 22. Of the plurality of tables, a table corresponding to an optional natural number p has a plurality of entries. In the table, each entry of the plurality of entries indicates a pair (combination) of one key and one value, and so that a plurality of keys are related to a plurality of values. That is, of the plurality of keys, an optional key corresponds to one value of the plurality of values.

Of the plurality of keys, an optional key indicates a value calculated when any data x in the data set X is substituted into the key calculation function $L^{(p)}(x)$, corresponding to an optional natural number p, of the plurality of key calculation functions calculated by the initializing section 22. Moreover, the plurality of keys are different from each other and include a plurality of values calculated when all of the data x belonging to the data set X are substituted into the key calculation function $L^{(p)}(x)$.

A value Table$^{(p)}$[L], corresponding to an optional key L, of the plurality of values indicates a data list as a set of predetermined data. At this time, the value Table$^{(p)}$[L] is calculated such that a value calculated by substituting an optional data x of the data belonging to the data list into the key calculation function $L^{(p)}(x)$, coincides with a key L.

The data registering section 23 further controls the table holding unit 10 so that the plurality of tables are recorded on the table holding unit 10.

A searching section 24 refers to the plurality of tables generated by the data registering section 23 when the query is outputted from the data processing unit 6, and calculates the data list based on the query. That is, the searching section 24 calculates a plurality of search keys corresponding to the plurality of tables based on the query. A search key $L^{(p)}(q)$ corresponding to the natural number p of the plurality of search keys indicates a value calculated when the query q is substituted into the key calculation function $L^{(p)}(x)$ corresponding to the natural number p of the plurality of key calculation functions calculated by the initializing section 22.

The searching section 24 refers to the plurality of tables generated by the data registering section 23 and calculates a data list List<x> based on the plurality of search keys. The data list List<x> indicates a set of predetermined data of the data belonging to the data set X. The data list List<x> is calculated such that, when one the plurality of tables which corresponds to the natural number p includes the entry corresponding to the key $L^{(p)}(q)$, the data belonging to the data list which is indicated by the value $Table^{(p)}[L]$ indicated by the entry is included.

At this time, the data processing unit 6 calculates a search resultant data $x_*$ based on the search condition 16 and the data list List<x> calculated by the searching section 24. The search resultant data $x_*$ indicates the set of the data, which satisfies the condition indicated by the search condition 16, in the data belonging to the data list List<x>. The data processing unit 6 further controls the output unit 15 so that the search resultant data $x_*$ is displayed.

In the exemplary embodiment, the directional nearest neighbor detecting method according to the present invention is executed by the similarity detecting apparatus 1 and contains an initializing operation, a data registering section-ing operation and a searching operation.

Figure 3:
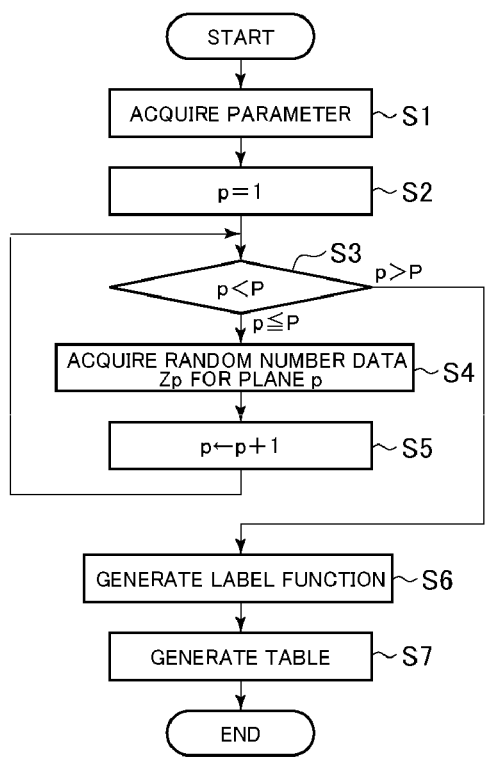
FIG. 3 is a flowchart showing an initializing operation.

FIG. 3 shows the initializing operation. The user firstly generates a parameter list 8 and operates the input unit 7 so that the parameter list 8 is received by the parameter managing unit 2. When the parameter list 8 is received through the input unit 7, the parameter managing unit 2 records the parameter list 8 in a recording medium. The table managing unit 5 gets the parameter list 8, which is inputted to the parameter managing unit 2, from the parameter managing unit 2 (Step S1).

The parameter list 8 indicates a table parameter, a management parameter and a directional parameter. The table parameter indicates data required to generate the table, namely, indicates a plane number P of the table, a window width W, a cardinal number C and a bit length B. The plane number P indicates a positive integer. The window width W indicates a positive real number. The cardinal number C indicates an integer of 2 or more. The bit length B indicates a positive integer. The management parameter indicates data required for the other management operations, namely, indicates the dimension number D. The directional parameter includes weight data of a direction and a distance of a feature detection and represents the directivity in the nearest neighbor detection and indicates the set U.

The set U is composed of the directional parameter $u_j$ and represented by the following equation:

$$U=\{u_j|u_j=<v_j,\bullet_j>\} \ (j=1,\ldots,D)$$

Here, the directional parameter $v_j$ indicates a D-dimensional vector. The intensity parameter $\bullet_j$ is a positive real number and indicates a weight given to the directional parameter $v_j$.

The table managing unit 5 substitutes "1" into a table plane number p (Step S2). The table managing unit 5 calculates an intensity relation between a value indicated by the table plane number p and the plane number P (Step S3).

When the value indicated by the table plane number p is not greater than the plane number P (Step S3, p≤P), the table managing unit 5 outputs the window width W, the bit length B, the dimension Number D and the set U in the parameter list 8 to the random number generating unit 3, and requests random number data from the random number generating unit 3. When the random number data is requested by the table managing unit 5, the random number generating unit 3 calculates the random number data indicating the set $Z_p$ based on the window width W, the bit length B, the dimension Number D and the set U.

The set $Z_p$ is composed of elements $Z_b$ and represented by the following equation:

$$Z_p=\{Z_b=<\bullet^{(p)}_b,R^{(p)}_b>\} \ (b=1,\ldots,B)$$

Here, the random number $R^{(p)}_b$ indicates a random number subject to the uniform distribution U[O, W] and is generated through B independent trials. The random vector $\bullet^{(p)}_b$ indicates a D-dimensional vector.

The random vector $\bullet^{(p)}_b$ is represented by the following equation:

$$\bullet^{(p)}_b=V^{-1/2}A_b$$

The matrix v is represented by the following equation:

$$V=(v_1,\ldots,v_D)$$

The diagonal matrix $\bullet^{-1/2}$ is represented by the following equation:

$$\bullet^{-1/2}=\text{diag}\{1/\bullet_1,\ldots,1/\bullet_D\}$$

The vector $A_b$ is a D-dimensional vector. A d-component $A_{b,d}$ (d=1, ..., D) of the vector $A_b$ indicates the random number subjected to a normal distribution N(0, 1). All of the components of the vector $A_b$ are generated through independent trials, respectively. The table managing unit 5 collects the random number data calculated by the random number generating unit 3, from the random number generating unit 3 (Step S4).

After the random number data is collected, the table managing unit 5 increments the table plane number p by "1", namely, adds "1" to the value indicated by the table plane number p and substitutes the calculated summation into the table plane number p (Step S5).

The table managing unit 5, after incrementing the table plane number p, calculates a relation between the value indicated by the table plane number p and the plane number P (Step S3). When the value indicated by the table plane number p is not greater than the plane number P (Step S3, p·P), the table managing unit 5 repeatedly executes the steps S4 to S5.

When the value indicated by the table plane number p is greater than the plane number P (Step S3, p>P), the table managing unit 5 calculates the plurality of (P) key calculation functions based on the random number data set Z and the parameter list 8 (Step S6).

Here, the random number data set Z indicates the plurality of (P) random number data that are collected when the step S4 is repeatedly executed. In the plurality of key calculation functions, the key calculation function $L^{(p)}(x)$ corresponding to the table plane number p is a function of the D-dimensional vector x.

The random number data set Z is represented by the following equation:

$$Z=\{Z_p\} \ (p=1,\ldots,P)$$

The key calculation function $L^{(p)}(x)$ is represented by the following equation, by using the D-dimensional vector x.

$$L^{(p)}(x)=(f^{(p)}_1(x),\ldots,f^{(p)}_B(x))$$

Here, the basic function $f^{(p)}_b(x)$ is represented by the above equation (refer to the equation 1).

After the calculation of the plurality of (P) key calculation functions, the table managing unit 5 generates a plurality of (P) tables in which entries are empty (Step S7). The plurality of tables correspond to the plurality of key calculation functions. The table managing unit 5 controls the table holding unit 10 and records the plurality of (P) tables in the table holding unit 10.

The data registering section operation is executed after the execution of the initializing operation. The user firstly generates the input data 12 and operates the input unit 11 and inputs the input data 12 to the table managing unit 5. The input data 12 indicates the data set X.

The data set X is composed of the data $x_i$ and represented by the following equation:

$$X = \{x_i | x_i \in R^D\} \ (i=1, \ldots, N)$$

Here, the set $R^D$ indicates the D-dimensional vector space. The natural number N indicates the total number of the data $x_i$ as the elements of the data set X and indicates a natural number greater than 1. The data $x_i$ indicates the D-dimensional vector.

When the input data 12 is received through the input unit 11, the table managing unit 5 controls a storage unit and stores the input data 12 in the storage unit.

When the input data 12 is received through the input unit 11, the table managing unit 5 executes the plurality of (P) table generating operations corresponding to the plurality of (P) tables generated by the initializing operation. In the plurality of table generating operations, the table generating operation corresponding to the table plane number p are generated by an plurality of (N) entry generating operations corresponding to all of the data belonging to the data set X.

In the entry generating operation, corresponding to a certain data $x_i$, of the plurality of (N) entry generating operations, the table managing unit 5 substitutes the data $x_i$ into the key calculation function $L^{(p)}(x)$, which corresponds to the table plane number p, in the plurality of (P) key calculation functions generated through the initializing operation, and consequently calculates a key $L^{(p)}(x_i)$. The table managing unit 5 determines whether or not an entry corresponding to the key $L^{(p)}(x_i)$ exists in the table, corresponding to the table plane number p, of the plurality of (P) tables generated through the initializing operation.

If the entry corresponding to the key $L^{(p)}(x_i)$ exists in the table, the table managing unit 5 additionally stores the data $x_i$ to the data list indicated by a value $Table^{(p)}[L^{(p)}(x_i)]$ of the entry. If the entry corresponding to the key $L^{(p)}(x_i)$ does not exist in the table, the table managing unit 5 additionally stores the entry corresponding to the key $L^{(p)}(x_i)$, to the table. At this time, the value $Table^{(p)}[L^{(p)}(x_i)]$ of the entry indicates the data list having only the data $x_i$ as an element.

The table managing unit 5 executes all the plurality of (N) entry generating operations and generates the table, corresponding to the table plane number p, of the plurality of (P) tables. The table managing unit 5 executes all the plurality of (P) entry generating operations and generates all of the plurality of (P) tables. The table managing unit 5 controls the table holding unit 10 and stores the plurality of tables in the table holding unit 10.

In the table generated in this way, optional two points indicated by two keys corresponding to optional two data are registered in a same entry at a probability which is higher when a distance measured in an optional length weight (importance) along a direction indicated by the directional parameter $u_j$ is shorter.

Figure 4:
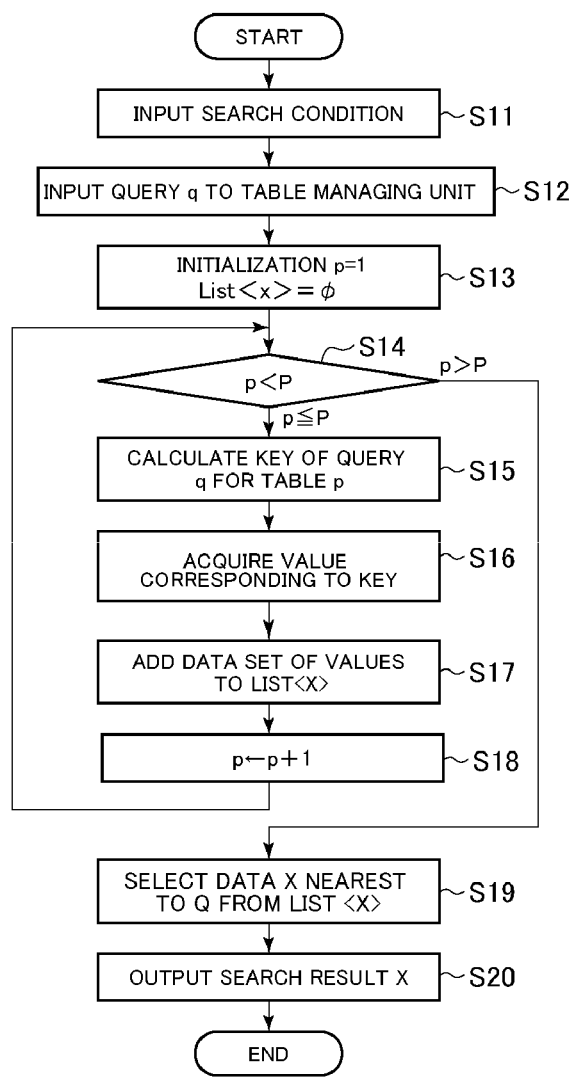
FIG. 4 is a flowchart showing a searching operation.

FIG. 4 shows the searching operation. The user firstly prepares the search condition 16 and operates the input unit 14 and inputs the search condition 16 to the data processing unit 6. The search condition 16 indicates a query q and a condition. As the condition, "one data in an area nearest to the query q is acquired" and K data are acquired from the data nearer to the query q" are exemplified. When the search condition 16 is inputted through the input unit 14, the data processing unit 6 controls the storage unit and records the search condition 16 in the storage unit (Step S11). When the search condition 16 is received, the data processing unit 6 further outputs the query q to the table managing unit 5 and requests the data list from the table managing unit 5 (Step S12).

When the query q is outputted by the data processing unit 6, the table managing unit 5 substitutes "1" into the table plane number p and generates an empty data list List<x>=• (Step S13). The table managing unit 5 calculates the relation between the value indicated by the table plane number p and the plane number P (Step S14). When the value indicated by the table plane number p is not greater than the plane number P (Step S14, p·P), the table managing unit 5 calculates the search key $L^{(p)}(q)$ based on the query q (Step S15).

The search key $L^{(p)}(q)$ indicates a value, which is calculated by substituting the query q into the key calculation function $L^{(p)}(x)$, corresponding to the table plane number p, of the plurality of key calculation functions calculated through the initializing operation.

The table managing unit 5 refers to the table, corresponding to the table plane number p, of the plurality of tables generated through the data registering operation to acquire a value $Table^{(p)}[L^{(p)}(q)]$ corresponding to the search key $L^{(p)}(q)$ (Step S16). The table managing unit 5 additionally stores data belonging to the data list indicated by the value $Table^{(p)}[L^{(p)}(q)]$, in the data list List<x> (Step S17).

Here, if there is data that belongs to both of the data list List<x> and the value $Table^{(p)}[L^{(p)}(q)]$, the table managing unit 5 adds only the data, which are not registered in the data list List<x> in the data indicated by the value $Table^{(p)}[L^{(p)}(q)]$, to the data list List<x>.

After the execution of the step S17, the table managing unit 5 increments the table plane number p by "1", namely, adds "1" to a value indicated by the table plane number p and substitutes the calculated summation into the table plane number p (Step S18). After incrementing the table plane number p, the table managing unit 5 calculates the relation between the value indicated by the table plane number p and the plane number P (Step S14). When the value indicated by the table plane number p is not greater than the plane number P (Step S14, p·P), the table managing unit 5 repeatedly executes the steps S15 to S18.

When the value indicated by the table plane number p is greater than the plane number P (Step S14, p>P), the table managing unit 5 outputs the data list List<x> to the data processing unit 6. The data list List<x> generated in this way becomes a candidate of the data when a distance is calculated while a specific direction of the query q is weighted with a proper weight.

When the table managing unit 5 outputs the data list List<x>, the data processing unit 6 calculates search resultant data $x_*$ based on a condition indicated by the search condition 16 and the data list List<x> (Step S19).

The search resultant data $x_*$ indicates a set of data, satisfying the condition, of the data belonging to the data list List<x>. If the condition indicates that "K data are acquired from data nearer to the query q" and the data list List<x> includes only k or less data, the search resultant data $x_*$ indicates all of data in the data list List<x>. Note that as a calculation for selecting data near to the query q from the data list List<x>, a usual Euclidean distance may be used, or a distance may be calculated by considering the importance specified in the directional parameter.

After the calculation of the search resultant data $x_*$, since the data processing unit 6 controls the output unit 15, the search resultant data $x_*$ is displayed on the output unit 15 (Step S20).

According to the directional nearest neighbor detecting method as mentioned above, the similarity detecting apparatus 1 can carry out the directional nearest neighbor detection, in which the data nearer to an interest center is preferentially selected at a high speed along the interest even in a high dimensional data, by setting a directional parameter by considering interest data indicating a direction and degree of an interest of a user.

Since the data located in a same distance (similarity) are selected in a same probability in a conventional method, data located on a concentric sphere from a certain search center are all detected in the same probability. For this reason, in order to extract only the data located in a distance r in a direction related to the interest, it is required that all of the data located inside a sphere having a radius r are selected at a time, and only the data located in the direction are preferentially extracted. In such a method, as the directivity becomes greater (as the weight of the importance in a direction becomes greater, compared with the weight of the importance in another direction), a larger quantity of unnecessary data must be acquired. Thus, a calculation time is increased in correspondence with the extraction.

On the contrary, in the technique according to the present invention, because the collision probability isogram can be controlled as an ellipsoid that has a longitudinal axis in the interest direction and not as an isotropic sphere, the directional nearest neighbor detection can be carried out in an optional direction in an optional weight, so that a large time reduction can be carried out desirably.

It should be noted that in the similarity detecting apparatus 1, the data processing unit 6 can be replaced with a plurality of computers in which the random number data acquiring section 21, the initializing section 22, the data registering section 23 and the searching section 24 are realized. Moreover, the similarity detecting apparatus 1 can be replaced with a single computer in which the parameter managing unit 2, the random number generating unit 3, the table managing unit 5 and the data processing unit 6 are realized. Moreover, the similarity detecting apparatus 1 can be formed by a plurality of computers in which any of the parameter managing unit 2, the random number generating unit 3, the data processing unit 6, the random number data acquiring section 21, the initializing section 22, the data registering section 23 and the searching section 24 is attained. Even the similarity detecting apparatus replaced in this way can carry out the directional nearest neighbor detection based on an optional weight in an optional direction, similarly to the similarity detecting apparatus 1.

Figures 5, 6:
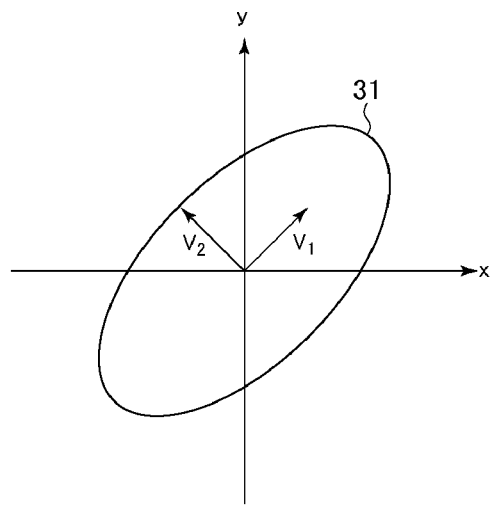
FIG. 5 is a table showing an example of a directional parameter.
FIG. 6 is a graph showing a collision probability isogram corresponding to the directional parameter.

Next, an example in which the directional nearest neighbor detecting method according to the present invention is applied to a two-dimensional (D=2) Euclidean space will be described. For example, as shown in FIG. 5, an example is discussed in which the set U relates a plurality of directional parameters 36 to a plurality of directional parameters 37 and a plurality of intensity parameters 38.

The plurality of directional parameters 36 are composed of two directional parameters $u_1$ and $u_2$. The plurality of directional parameters 37 are composed of a directional parameter $v_1$ indicative of (1/sqrt(2), 1/sqrt(2)) and a directional parameter $v_2$ indicative of (−1/sqrt(2), 1/sqrt(2)). The plurality of intensity parameters 38 are composed of an intensity parameter $\bullet_1$ indicative of "2" and a intensity parameter $\bullet_1$ indicative of "1". The directional parameter $u_1$ relates the directional parameter $v_1$ to the intensity parameter $\bullet_1$. The directional parameter $u_2$ relates the directional parameter $v_2$ to the intensity parameter $\bullet_2$.

That is, the set U is represented by the following equation:

$$U=\{<(1/\text{sqrt}(2),1/\text{sqrt}(2)),2>,<-1/\text{sqrt}(2),1/\text{sqrt}(2),1>\}$$

At this time, the directional parameter $v_1$ indicates a direction that is inclined counterclockwise by an angle of 45 from an x-axis, as shown in FIG. 6. The directional parameter $v_2$ indicates a direction orthogonal to the direction indicated by the directional parameter $v_1$. The set U indicates that, since the intensity parameter $\bullet_1$ indicates a value equal to two times of the value indicated by the intensity parameter $\bullet_2$, the direction of the directional parameter $v_1$ is weighted twice as compared with the direction of the directional parameter $v_2$.

In the input data 12, a distribution of the data belonging to the set X is assumed to be optional. The condition of the search condition 16 indicates "the data having the shortest distance from the query q to the input of the query q".

At this time, a collision probability isogram 31 is formed as an ellipsoid that has a longitudinal axis in the direction of the directional parameter $v_1$. That is, all of the data on the collision probability isogram 31 are detected at a same probability. In the similarity detecting apparatus 1, data in the direction of the directional parameter $v_1$ in a distance twice of a distance of data in the direction of the directional parameter $v_2$ is regarded to belong to a same probability set, and the search resultant data can be searched from the data belonging to the set X. That is, since the similarity detecting apparatus 1 can control a detection probability, the similarity detecting apparatus 1 can carry out the directional nearest neighbor detection based on the weight of the intensity parameter $\bullet_1$ in the direction of the directional parameter $v_1$.

In the second exemplary embodiment of the similarity detecting apparatus according to the present invention, the directional parameter indicated by the parameter list 8 in the above-mentioned exemplary embodiment is replaced with another directional parameter.

The directional parameter indicates a set configured from a set $U_k$, and the set is represented by the following equation:

$$\{U_k\}\ (k=1,\ldots,K)$$

The set $U_k$ is represented by the following equation:

$$U_k=\{u_j|u_j\epsilon R^D\cdot R_+\}\ (j=1,\ldots,D)$$

At this time, the set $U_k$ differ from each other. That is, one of the directional parameter v and the intensity parameter $\bullet$ is different.

For example, for simplicity of the description, in case of the two-dimension of D=2, the set $U_k$ is represented by the following equation:

$$U_k=\{<v_x,\bullet_x 2^p>,<v_y,\bullet_y 2^p>\}$$

Here, a directional parameter $v_k$ indicates a unit vector in an x-axis direction. A directional parameter $v_y$ indicates a unit vector in a y-axis direction. A variable p indicates an integer of "0" or more. An intensity parameter $\bullet_x$ indicates a basic weight in the x-axis direction. An intensity parameter $\bullet_y$ indicates a basic weight in the y-axis direction.

Figure 7:
FIG. 7 is a table showing an example of the directional parameter.

For example, there are four cases of p=0, 1, 2 and 3 and two cases of $(\bullet_x, \bullet_y)=(1, 3)$ and $((3, 1)$, the directional parameter sets of $U_k$ of k=2×4=8 cases are specified, as the directional parameter U, as shown in FIG. 7.

At this time, the similarity detecting apparatus generates a plurality of key calculation function sets corresponding to a plurality of sets that belong to the set U indicated by the directional parameter. Of the plurality of key calculation function sets, the key calculation function set corresponding to the set $U_k$ indicates the plurality of key calculation functions. The plurality of key calculation functions are calculated based on the set $U_k$, similarly to the plurality of key calculation functions that are calculated based on the set U by the similarity detecting apparatus 1 in the above-mentioned exemplary embodiment.

Figure 8:
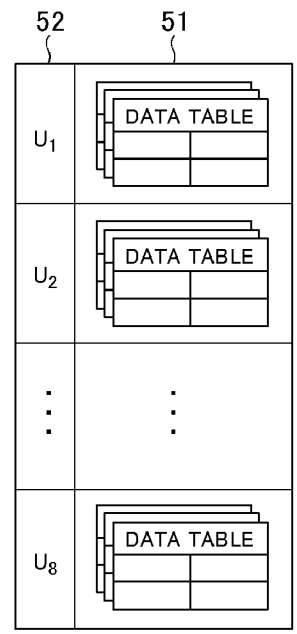
FIG. 8 is a table showing an example of a plurality of table sets.

The similarity detecting apparatus generates a plurality of table sets 51 corresponding to a plurality of key calculation function sets 52 based on the input data 12 and the plurality of key calculation function sets, as shown in FIG. 8. An optional table set in the plurality of table sets 51 indicates a set composed of the plurality of tables.

The plurality of tables are generated similarly to the plurality of tables in the above-mentioned exemplary embodiment. That is, in the plurality of tables, the table corresponding to an optional table plane number p relates a plurality of keys to a plurality of values.

An optional key of the plurality of keys indicates a value that is calculated by substituting any data x of the data set X into the key calculation function $L^{(p)}(x)$, corresponding to the table plane number p, of the plurality of key calculation functions.

Of the plurality of values, the value $Table^{(p)}[L]$ corresponding to an optional key L indicates a data list that is a set of predetermined data. At this time, the value $Table^{(p)}[L]$ is calculated such that a value which is calculated by substituting an optional data x of the data belonging to the data list into the key calculation function $L^{(p)}(x)$ coincides with the key L.

Figure 9:
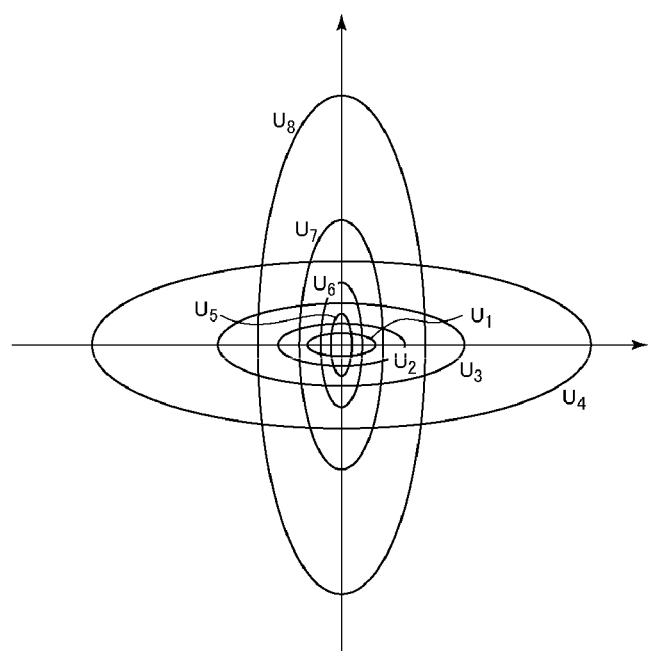
FIG. 9 is a graph showing a plurality of collision probability isograms corresponding to a plurality of directional parameters.

FIG. 9 shows a plurality of collision probability isograms that indicate the directivities specified in the sets $U_k$, respectively. Each of the plurality of collision probability isograms is formed as an ellipsoid that has the longitudinal axis in the direction of the directional parameter, and they differ from each other.

The data on the collision probability isogram, corresponding to the set $U_k$ of the plurality of collision probability isograms are all detected in a same probability, by using the plurality of tables indicated by the table set corresponding to the set $U_k$ of the plurality of table sets 51, similarly to the collision probability isogram 31 shown in FIG. 6. The similarity detecting apparatus generates and manages tables generated for the number of the planes which specify the tables corresponding to the respective directional parameters, similarly to the method described in the above-mentioned exemplary embodiment.

The user supplies another search condition which differs from the search condition 16 to the similarity detecting apparatus at the time of the searching operation.

The searching condition indicates the directional parameter and the query and condition that are indicated by the search condition 16. The directional parameter indicates a set of pairs of a direction and an intensity. The similarity detecting apparatus selects the table set corresponding to the set $U_k$ indicative of the directional parameter and nearest to the directional parameter from the plurality of table sets 51. The similarity detecting apparatus uses the plurality of tables belonging to the table set to calculate the plurality of search data lists and calculate the data list List<x>.

The searched data list corresponding to a table set of the plurality of search data lists coincides with a data list indicated by a value, corresponding to the key of the query, of the plurality of values in the table set. The data list List<x> includes the plurality of search data lists corresponding to the plurality of table sets.

The similarity detecting apparatus in the second exemplary embodiment as mentioned above has a function that the plurality of table sets are generated in advance and the table to be used is selected in response to the search. Thus, even if the directional parameter is preliminarily unknown, it is possible to carry out the directional nearest neighbor detection by inputting the directional parameter of "an intensity of this degree in this direction at this point" at the time of the searching operation.

It should be noted that an example in which the table is prepared to have the directional parameters for only 8 cases is shown. However, generally, further more directional parameters may be used. Thus, as various pairs of direction and intensity are prepared, more precise outputs can be returned for various search requests. The number of the table sets may be determined by using a tradeoff relation to a calculation resource.

Also, as in this example, a searching person inputs the specification of the directional parameter in the search in accordance with the format of the directional parameter U (the set of the pairs of the direction and the intensity). However, this may be carried out such that a more instinctive input is carried out and converted into the format of the directional parameter in the data processing unit.

As an example of the more instinctive input, it is possible to specify the directivity of the search by specifying a length in an interest direction regarded as being equal to a unit length in a non-interest axis direction, (for example, when a length 1 in a direction of the angle of 45 degrees from the x-axis is equivalent to a length 3 in a direction of the angle of −45 degrees from the x-axis, even if the direction of the angle of −45 degrees from the x-axis is more distant three times than the direction of the angle of 45 degrees in real distance, they can be detected at a same probability).

Moreover, in this example, an example in which one optimal table is selected and outputted for the directivity data in the search is described. However, a directional nearest neighbor search result in which the plurality of tables are combined may be outputted. Specifically, for example, the vicinity search results executed in the respective tables may be displayed based on the weight by using a distance between the directivity data specified for the search and the directivity data of the table are used.

Implementation Example 1

A first example in the directional nearest neighbor detecting method according to the present invention will be described in detail. The present example describes a method of detecting an image similar in a feature at a high speed.

Figure 10:
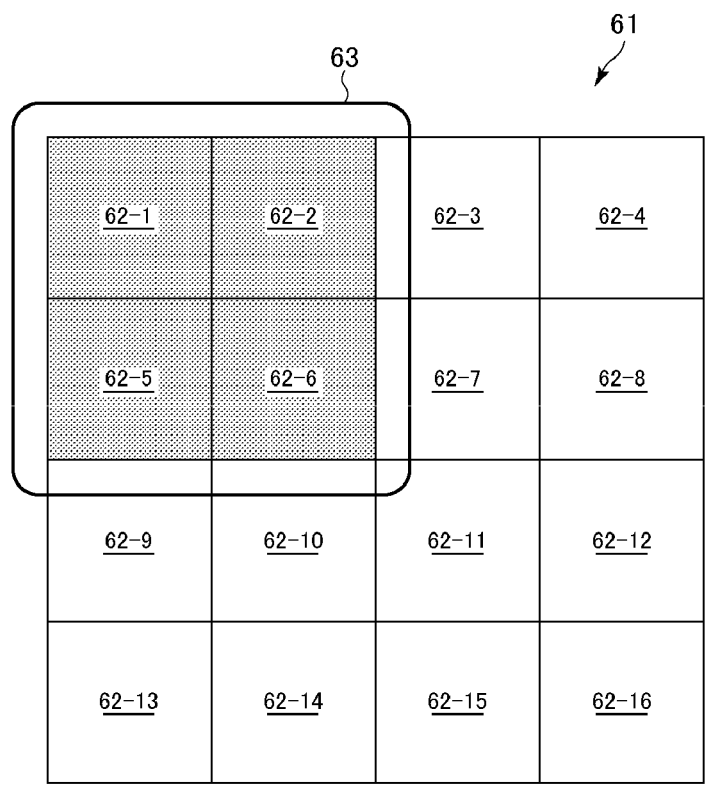
FIG. 10 is a diagram showing an image.

Image data that shows an image can be generally represented by using a D-dimensional feature vector. Although various methods are considered, the image data is considered in which an image 61 is divided into a plurality of pixels 62-1 to 62-16 in proper meshes as shown in FIG. 10, and the image data is represented by defining a pixel value of each pixel 62-$i$ as one example.

Here, it is supposed that a feature vector is generated by raster-scanning the pixel values of the respective pixels and arraying the pixel values. Note that in the raster scanning, the values are scanned in order from left to right, starting from the upper left, and when having reached the right end once, the same procedure is repeated after falling down to the next line.

For example, a feature vector u of an optional image that is divided in units of 4×4 pixel blocks is represented as a 16-dimensional vector. For example, when 16 unit vectors $e_1$ to $e_{16}$ and 16 pixel values are used, the feature vector u is represented by the following equation:

$$u = \sum_{i=1}^{16} c_i e_i$$

Here, the unit vector $e_i$ is a vector in which only the $i^{th}$ component indicates "1" and the other components indicate "0".

Here, it is supposed that the user is interested in only a feature direction. In the simplest, a case is considered in which the user is interested in only an interest region 63 as a part of the image 61 and ignores the similarity except it. In such a case, the user attaches importance to only a first component, a second component, a fifth component and a sixth component in the feature vector u and does not attach importance to the other pixels.

Here, when the weight to be loaded is decoupled (the distance of "1" in an uninterested direction and the distance of "10" in an interested direction are regarded as being equivalent), a directional parameter $U=\{u_i=<v_i, \bullet_i>\}$ (i=1, ..., 16) is set to be $v_i=e_i$, $\bullet_i=10$ (i=1, 2, 5, 6), and "1" (others). By using the directional parameter U and carrying out the directional nearest neighbor detection shown in the above-mentioned exemplary embodiment, it is possible to carry out a similar image search that gives the importance to the similarities of the first, second, fifth and sixth pixels, for the input of a query image q.

Moreover, the directional nearest neighbor detecting method according to the present invention can carry out a similar image detection in which a combination of a proper rate of pixels is defined as a feature direction. For example, a case is considered where importance is given to the similarity of a ratio among the first, second, fifth and sixth pixel values.

As the interest direction, a directional parameter $v_1$ when the first, second, fifth and sixth pixels are added in a same weight is defined by the following equation:

$v_1=(e_1+e_2+e_5+e_6)/2$

It is possible to configure normal orthogonal coordinate systems $\{v_1, v_2, \ldots, v_6\}$ in which axes are orthogonal to each other, from the directional parameter $v_1$ and $\{e_1\}$ (i=2, ..., 16) by using the orthogonalizing method of Gram-Schmidt to the directional parameter $v_i$.

Similarly to the above examples, when the direction of the directional parameter $v_1$ is given with the weight of ten times compared with other directions, the image in which an image identical in the ratio of the first, second, fifth and sixth pixel values can be detected as a similar image, by setting the directional parameter U ($U=\{u_i=<v_i, \bullet_i>\}$ (i=1, ..., 16)) to $\bullet_i=10$ (i=1)), and "1" (others). Thus, for example, when the denseness of a color as the pixel value is represented as a real value of 0 to 1, it can be detected as a similar image even if a difference among the pixel values except the target portion is slightly large, if the ratio of the denseness of a target portion is closer.

Example 2

Next, a second example of the directional nearest neighbor detecting method according to the present invention will be described below in detail. In the second example, a similar function search is carried out in which attention is paid to a local feature of a multi-dimensional function. As a typical example, time series data $\{v(ti)\}$ (i=1, 2, ...) is considered that is represented by a set of multi-dimensional vectors.

Here, the time series data v(ti) indicates a multi-dimensional vector at a time ti. As the time series data, a data is exemplified in which a three-dimensional vector is represented from acceleration values of an acceleration sensor in an x-axis direction, a y-axis direction and a z-axis direction at the time ti at a point. In such a case, a set of points when times on the three-dimensional vector space are used as a parameter is the time series data.

The present example searches at a high speed the time series data, which is similar only in a partial region, for a time series data serving as the query, of a large quantity of time series data (for example, a time series data of acceleration data in a large quantity of points).

Figure 11:
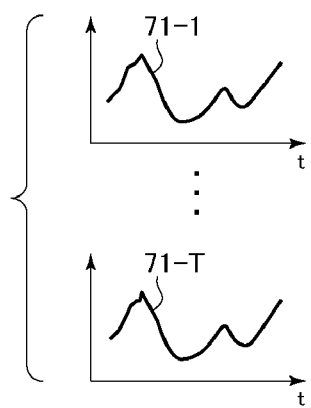
FIG. 11 is a graph showing the plurality of search target data.

FIG. 11 shows a plurality of time series data 71-1 to 71-T that are a search target in the present example. The user firstly inputs the plurality of time series data 71-1 to 71-T to a similarity detecting apparatus in the present example. The similarity detecting apparatus sequentially registers the respective points for the time series data in a plurality of tables corresponding to the plurality of directional parameters, similarly to the similarity detecting apparatus in the second exemplary embodiment.

Here, the plurality of directional parameters are simply classified into two kinds of: a directional parameter that has a long axis in the x-axis direction and a short axis in the y-axis direction; and another directional parameter that has a directivity in a direction rotated by the angle of 90 degrees from the long axis. A plurality of intensities can be typically specified for the intensities of the directional parameter. However, for example, the ratio of 3:1 is supposed to be set.

Figure 12:
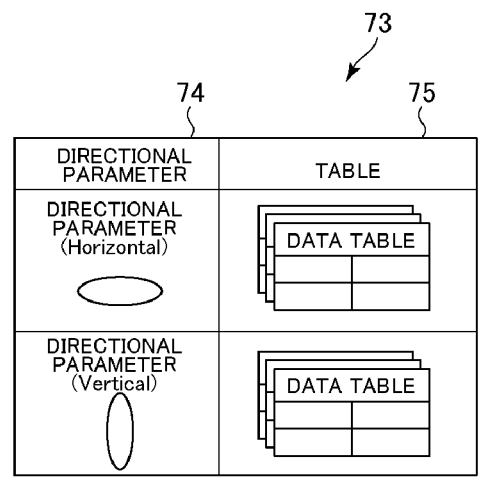
FIG. 12 is a table showing an example of the plurality of table sets.

The similarity detecting apparatus generates a plurality of table sets 75 corresponding to the plurality of directional parameters 74, as shown in FIG. 12. Here, the number of the tables belonging to each table set of the plurality of table sets 75 is defined as K. The similarity detecting apparatus calculates a key for each point of the time series data to register in the value for all of the tables, similarly to the similarity detecting apparatus in the above-mentioned exemplary embodiments.

Figure 13:
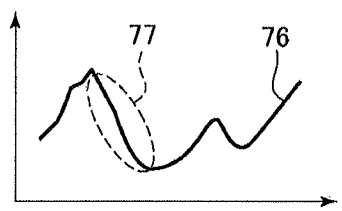
FIG. 13 is a graph showing an example of a query of a search condition.

At the time of the search, as shown in FIG. 13, the user inputs a time series data 76 and specifies a search range parameter 77, which indicates an interested region (search target region) of the time series data 76 as a query. Here, the search range parameter 77 is sufficient to specify the interested region of the time series data 76. For example, the search range parameter 77 may be a data that indicates the range of a coordinate value or may be a data that indicates the range of a parameter (for example, a time t and the like) of each data. Also, the search range parameter 77 may be a partial time series data in which only data within the range of the interested region is extracted from inside the time series data 76.

Figure 14:
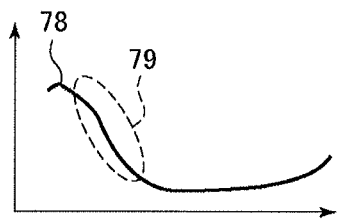
FIG. 14 is a graph showing an example of a search resultant data.

Similarly to the similarity detecting apparatus in the above-mentioned exemplary embodiment, the similarity detecting apparatus refers to the plurality of tables belonging to the table set selected by the user, of a plurality of table sets 75, and extracts a time series data 78 as shown in FIG. 14, and then controls the output unit 15 so that the time series data 78 is represented in a manner which can be recognized by the user. The time series data 78 is composed of data included in the plurality of search data lists corresponding to the plurality of tables. The search data list corresponding to a table of the plurality of search data lists shows a data list indicated by a value corresponding to a query value that is calculated by substituting the query into the key calculation function corresponding to the table.

Figure 15:
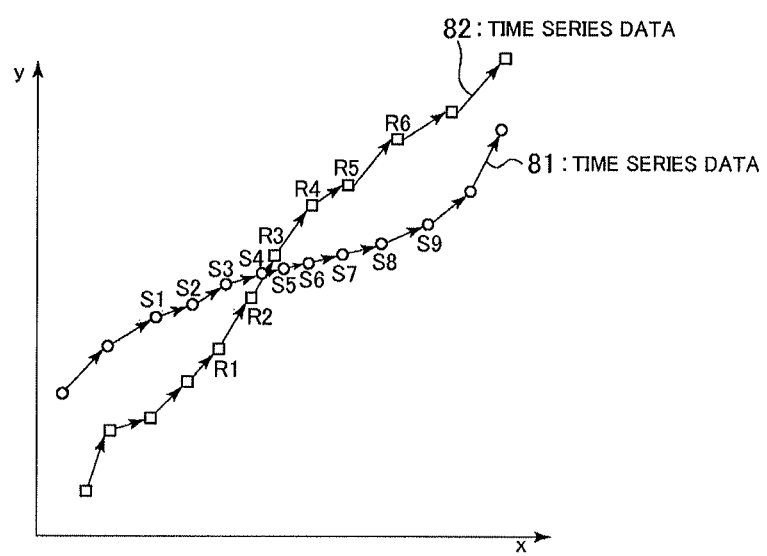
FIG. 15 is a graph showing a plurality of time series data.

Another example in the directional nearest neighbor detecting method according to the present invention will be described below in detail. In this example, in order to carry out a range limit similarity function search, a function for judging a similarity whose range the inputted time series data and an optional time series data is limited will be described below in detail. For the simplicity of description, it is a case is considered of calculating a similarity of a time series data 82 to a time series data 81 in the two-dimensional space that is schematically shown in FIG. 15. Here, as a limit of a search range, a case is considered the comparison of the local feature of only a part, which belongs to a time interval [tmin:tmax] specified by the user, in both of the time series data.

Figure 16:
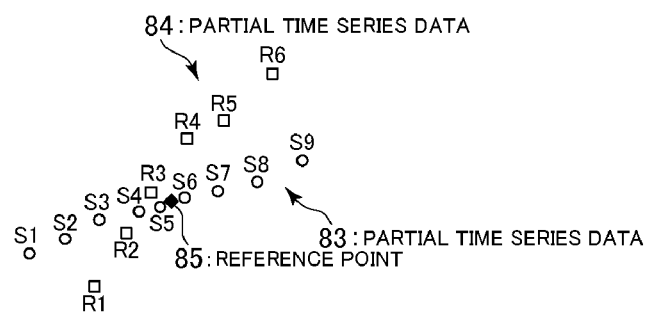
FIG. 16 is a graph showing a plurality of search target data of the plurality of time series data.

The time series data 81 has $\{Si\}$ ($i=1, \ldots, 9$) as a data belonging to the time interval. The time series data 82 has $\{Ri\}$ ($i=1, \ldots, 6$) as a data belonging to the time interval. At this time, as shown in FIG. 16, a partial time series data 83 in from a restricted range of the time series data 81 is formed from $\{Si\}$ ($i=1, \ldots, 9$) and a partial time series data 84 in a restricted range of the time series data 82 is formed from $\{Ri\}$ ($i=1, \ldots, 6$).

Here, the user further extracts a central reference point 85 as a query from a point group $\{Si\}$ ($i=1, \ldots, 9$) of the partial time series data 83. The reference point 85 is a point that represents the partial time series data 83 in the best manner. For example, the reference point 85 may be an average of all of the points, or may be a point closest to the average, or may be an average of the maximum and minimum values (the average of S1 and S9 in this example).

Next, the similarity detecting apparatus calculates a probability (collision probability) that the reference point 85 and the respective points of the partial time series data 83 and the partial time series data 84 are registered on the same entry in a plurality of tables that belong to each of a plurality of table sets 75, and calculates a plurality of collision probability distributions corresponding to the plurality of directional parameters 74. Each of the plurality of collision probability distributions shows a function of a distance from the reference point 85 to the data which belongs to the partial time series data 83 or the partial time series data 84.

Figure 17:
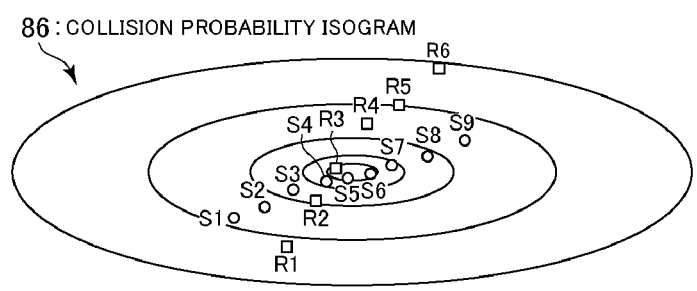
FIG. 17 is a graph showing a plurality of collision probability isograms.
Figure 18:
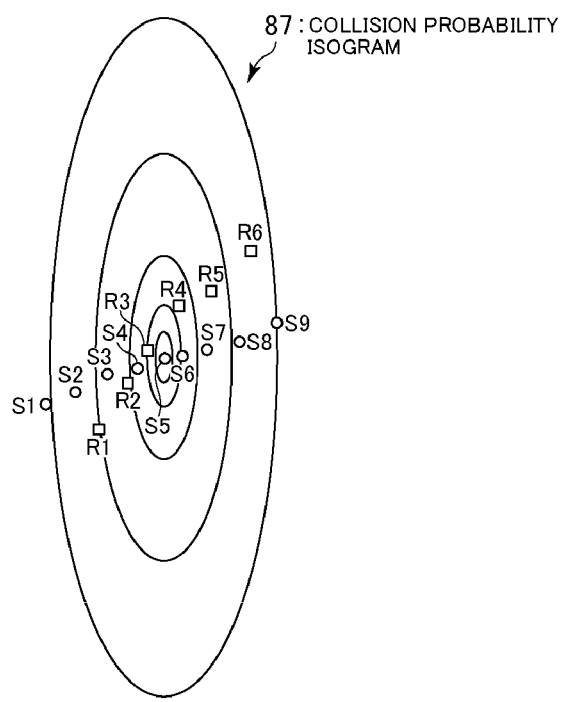
FIG. 18 is a graph showing another plurality of collision probability isograms.

FIG. 17 shows a collision probability isogram corresponding to a first directional parameter of the plurality of directional parameters. The collision probability isogram 86 has a long axis in the x-axis direction and has a short axis in the y-axis direction. FIG. 18 shows a collision probability isogram corresponding to a second directional parameter of the plurality of directional parameters. The collision probability isogram 87 has a long axis in the x-axis direction and has a short axis in the y-axis direction.

Figure 19:
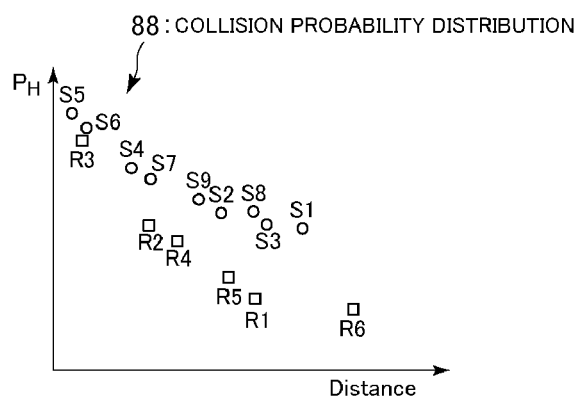
FIG. 19 is a graph showing a collision probability distribution.

FIG. 19 shows the collision probability distribution. The collision probability distribution 88 shows a collision probability that the respective data which belong to the partial time series data 83 and the partial time series data 84 are registered on the same entry of the table calculated based on the first directional parameter, as the reference point 85.

Figure 20:
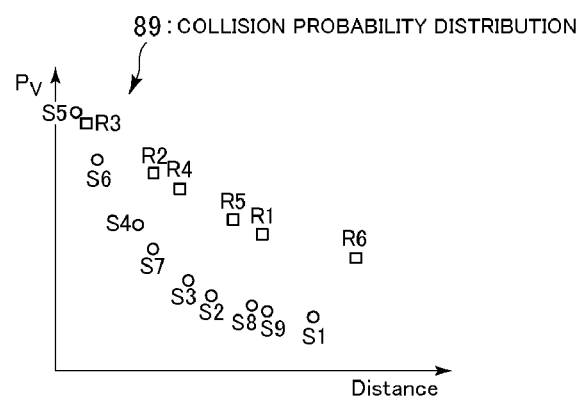
FIG. 20 is a graph showing another collision probability distribution.

FIG. 20 shows another collision probability distribution. The collision probability distribution 89 shows a collision probability that the respective data which belong to the partial time series data 83 and the partial time series data 84 are registered on the same entry of the table calculated based on the second directional parameter, as the reference point 85.

Those values are approximated by measuring the number L that both actually collide with each other (both are registered on the same entry) and calculating a ratio of the number L to a total table number K of each of directional parameters, as the collision probability (L/K). The collision probability distribution 88 and the collision probability distribution 89 show that the collision probability between each of the points of the time series data and the reference point 85 depends on the positional relation between both and the direction and intensity which are shown by the directional parameter. The collision probability distribution 88 and the collision probability distribution 89 have more similar distribution shapes, as the two partial time series data to be compared are more similar to each other. Thus, by comparing a difference in those shapes, it is possible to evaluate the similarity between optional two partial time series data.

Figure 21:
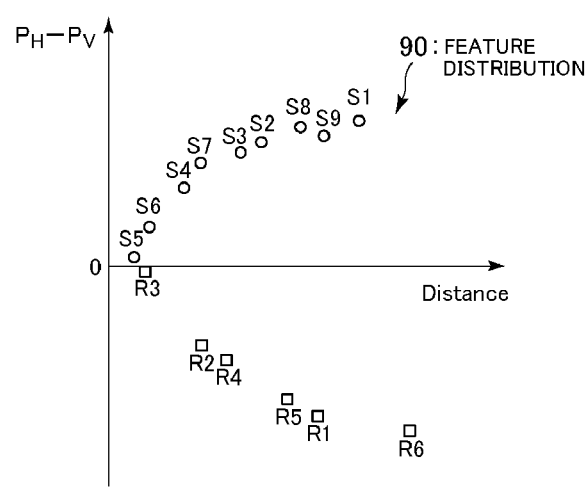
FIG. 21 is a graph showing a feature distribution.

FIG. 21 shows a feature distribution. The feature distribution 90 shows a difference in the collision probability between the respective partial time series data for the collision probability distribution 88 and the collision probability distribution 89. The shape of the feature distribution 90 of each of the partial time series data can be evaluated as the similarity of the partial time series data. As a method of calculating this similarity, a method of calculating an inner product between functions that are smoothly interpolated, or a method of using a distance evaluation scale such as $E_a r_i h$ Mover's Distance may be considered. However, the method is not limited to them. An optional method that can quantitatively evaluate the similarity of the shape of a function (a function value when a distance is given) can be used.

When the above method is used, it is possible to extract the time series data having the highest similarity to the time series data specified based on the query in a specified search range. Specifically, the reference point is calculated from the partial time series data specified based on the query, and the data within the search range is extracted from the data colliding with the reference point in all of the tables belonging to the plurality of table sets 75 (in this example, only the data within a specified time range), and the collision probability distribution corresponding to each time series data is generated. Thus, the similarity to the collision probability distribution of the partial time series data specified based on the query is evaluated.

Here, in this example, the search range is specified as a continuous zone. However, typically, the execution in a plurality of zones can be easily attained by applying the similar method to the respective zones and integratedly evaluating the similarities in the respective zones.

The effect of this example will be described below. According to this example, it is possible to greatly speed up the extraction processing of the most similar time series data from all of the time series data as a search target based on the input of the actual query and range.

This is because the comparison between all of the partial time series data corresponding to the search range and the partial time series data of the query has to be carried out online in the usual method. Therefore, as the number of the search target data increases, the calculation time increases, which causes a response speed to be delayed.

However, according to this example, the time series data of the search target can be registered in the table offline previously. Thus, what should be actually evaluated in an online process is only the time series data composed of the data colliding with the reference point and the corresponding collision probability distribution. In particular, when the number of the time series data of the search target is enormous, the large reduction in the number of the target data can be expected.

It should be noted that in this example, the time is treated as the parameter. However, for example, by properly multiplying the time itself by an optional number, or performing a proper conversion on the time, it is possible to carry out the search as one coordinate value in a format that can be compared with a value of the time series data.

Example 3

Figure 22:
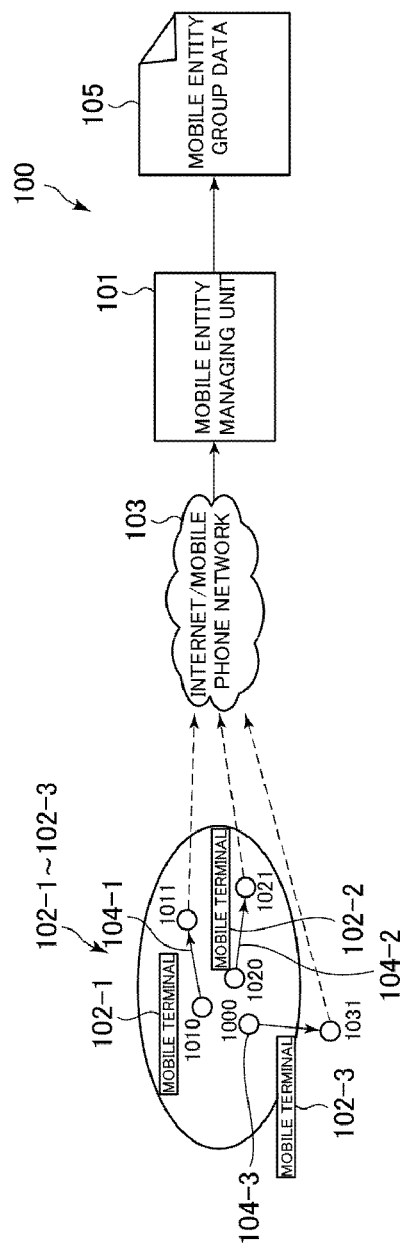
FIG. 22 is a block diagram showing a mobile entity managing system.

Next, a third example of the present invention will be described below in detail. In the third example, the similarity detecting apparatus according to the present invention is applied to a mobile entity managing system 100, as shown in FIG. 22.

In the mobile entity managing system 100, a plurality of computers are connected to each other through a network 103 so that data can be bi-directionally transmitted. As the network 103, the Internet, a mobile phone network and the like are exemplified. The plurality of computers include a mobile entity managing unit 101 and a plurality of mobile terminals 102-1 to 102-3. Each of the plurality of mobile terminals 102-1 to 102-3 is a device carried by the user and can acquire a current position data. As such a device, a smart phone, a GPS logger and the like are exemplified.

The mobile entity managing unit 101 contains the similarity detecting apparatus in the above-mentioned exemplary embodiment and provides a function of managing the movement directions of the plurality of mobile terminals 102-1 to 102-3 and grouping the mobile terminals moving in similar directions. For example, with regard to each of the plurality of mobile terminals 102-1 to 102-3, the mobile entity managing unit 101 manages a pair of a current position and a position previous to a proper time •. Here, for the simplification of description, a space to be treated is defined as a two-dimensional space, and a main movement direction desired to be detected is defined as the x-axis direction. The directional parameter is set such that the intensity is set to give a proper directivity to the x-axis direction, as compared with the y-axis direction. As an example of the intensity, for example, by multiplying the intensity of the x-axis direction by an optional number of v, and multiplying the intensity of the y-axis direction by 0.1. Thus, the upper limit of a speed to be desired to be detected is defined for the intensity of the x-axis direction, and the allowable range of a directional deviation can be defined for the y-axis direction.

The plurality of mobile terminals 102-1 to 102-3 are assumed to exist at a position 1010, a position 1020 and a position 1030 at a certain time t, respectively, and move to a position 1011, a position 1021 and a position 1031 at a time t+•, respectively. The plurality of mobile terminals 102-1 to 102-3 acquire respective current positions through GPS and periodically upload respective position data to the mobile entity managing unit 101 through the network 103.

Figure 23:
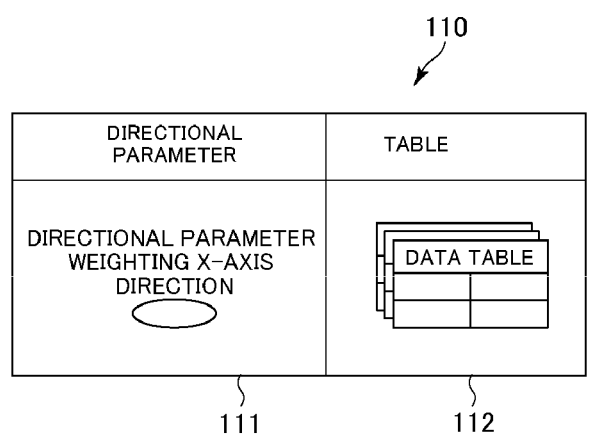
FIG. 23 is a table showing the plurality of table sets.

The mobile entity managing unit 101 generates a plurality of table sets 112 corresponding to a plurality of directional parameters 111, as shown in FIG. 23, similarly to the similarity detecting apparatus in the above-mentioned exemplary embodiments. The mobile entity managing unit 101 uses the plurality of table sets 112 and manages the positions of the plurality of mobile terminals 102-1 to 102-3, and calculates the keys of the respective tables, for the position 1010, the position 1011, the position 1020, the position 1021, the position 1030 and the position 1031, and then registering sections in the values corresponding to their keys. The mobile entity managing unit 101 uses those table sets and groups the mobile terminals moving in the x-axis direction, in the plurality of mobile terminals 102-1 to 102-3, and outputs a mobile entity group data 105 that includes the data relating to the property of the group.

Next, a method of generating the mobile entity group data 105 by the mobile entity managing unit 101 will be described. If the mobile terminal moving in the x-axis direction at a set speed, the position coordinates of the time t and the time t+• have a possibility that they have the same key. However, the mobile terminal moving in the orthogonal y-axis direction, has a high possibility that it has a different key. Thus, both can be discriminated.

In the present example, there is a high possibility that the position 1010, the position 1011, the position 1020 and the position 1021 as the position data of the mobile terminal 102-1 and the mobile terminal 102-2 are registered in the same entry and the position 1030 and the position 1031 as the position data of the mobile terminal 102-3 are registered in a different entry. For this reason, the mobile terminal 102-1 and the mobile terminal 102-2 moving in the x-axis direction at the similar speeds can be grouped into a same group.

The present example indicates a case of only the directional parameter of one kind. However, typically, by specifying the plurality of directional parameters, it is possible to set a plurality of interest directions and a plurality of movement speed upper limit. Thus, it is possible to generate various grouping policies of the mobile terminals.

Also, by paying attention to a mobile terminal and monitoring a table entry on which the mobile terminal is registered, it is possible to detect a different mobile terminal that travels parallel to this mobile terminal. For example, with respect to the input of the search target mobile terminal, a mobile terminal that belongs to the same group as this search target mobile terminal in past or at present can be outputted as a parallel moving mobile terminal.

At that time, by further setting the grouping policy as necessary, the grouping can be modified in response to the policy. For example, when "a mobile terminal moving in parallel to a search target mobile terminal while previously existing within a range of the radius of 100 m for 10 minutes or more" is set as the grouping policy, only the mobile terminal that can satisfy the condition may be filtered from the mobile terminal group outputted according to the present invention and outputted.

Moreover, when the number of the mobile terminals is enormous, of the mobile terminals registered in the respective entries of the respective tables, the number of the mobile terminals, which are registered in the same entry at both of the position at the time t and the position at the time t+•, are counted, and the sets of the mobile terminals of a proper number having been registered in descending order in the entry are extracted.

This extraction implies that, of all of the mobile terminals, the mobile terminals moving along the same direction are sampled in order from the group that the number of the above moving mobile terminals is more. By grouping those sampled mobile terminals based on their movement directions and speeds, the main trend of mobile terminal movement patterns in the entire system (a direction and speed of movement of the many mobile terminals) is extracted, and a mobile terminal group data such as a size, a direction, a speed and the like of the mobile terminal group can be generated, and the movement state of the mobile terminals can be classified or displayed.

The effect of this example will be described below. In the mobile entity managing system 100, basically, the table to be managed is updated in response to update of the position of the mobile terminal, and the mobile terminals having a highly interested are sampled and grouped from the table by using the above method. Thus, it is not required to group all of the mobile terminals by calculating the mutual relation of them with regard to the movements of them. For this reason, even if the number of the mobile terminals increases, the increase in the calculation load can be suppressed. Thus, the great reduction in the calculation time can be expected.

It should be noted that in all of the exemplary embodiments and examples shown in the present invention, as the calculating method of the key of the table, the key calculation function $L^{(p)}(x)$, the basic function $f^{(p)}{}_b(x)$ and the random vector $\bullet^{(p)}{}_b$ are used in the above-mentioned exemplary embodiments. However, if the asymmetry for a desirable direction and intensity is introduced based on the parameter specifying the directivity, the present invention is not limited to the above example.

It should be noted that in all of the exemplary embodiments and the examples shown in the present invention, the collisions of the data in the table have been described to be strictly registered in the same entry. However, as a variation, a collision range may be enlarged such that an entry distance of the table is defined, and the data registered in near entries collides (for example, "an adjacent entry" that is different by one bit of a key represented by the key calculation function $L^{(p)}(x)$)).

<Remark>

As mentioned above, the exemplary embodiments and the implementation examples in the present invention have been described in detail. Actually, the present invention is not limited to the above-mentioned exemplary embodiments and implementation examples. Thus, modifications in a range without departing from the spirit of the present invention are included in the present invention.

<Supplemental Note>

A part or all of the above-mentioned exemplary embodiments and implementation examples can be described as in the following supplemental notes. However, actually, the present invention is not limited to the following supplemental notes.

<Supplemental Note 1>

A similarity detecting apparatus including:

a random number generating section for calculating a plurality of random number data based on a plurality of directional parameters and a plurality of intensity parameters which are inputted through an input unit;

an initializing section for calculating a plurality of key calculation functions based on the plurality of random number data;

a data registering section for calculating a plurality of tables corresponding to the plurality of key calculation functions based on a plurality of search target data inputted through the input unit and recording the plurality of tables in a table holding unit;

a searching section for referring to the plurality of tables and calculating a candidate data list based on a query indicated by a search condition inputted through the input unit; and a data processing section for calculating search resultant data from a plurality of search data belonging to the candidate data list so as to satisfy a condition shown by the search condition, and outputting the search resultant data to an output unit, wherein when calculating a table corresponding to an optional key calculation function of the plurality of tables, the data registering section relates a plurality of the keys to a plurality of the data lists and calculates the table such that a value calculated by substituting data belonging to one of the plurality of data lists corresponding to an optional key into the key calculation function for the optional key is equal to the optional key, wherein a candidate data list includes a plurality of search data lists corresponding to the plurality of key calculation functions, and wherein one of the plurality of search data lists corresponding to the optional key calculation function shows the data list of the plurality of data lists corresponding to a query value calculated by substituting the query into the key calculation function.

<Supplemental Note 2>

The similarity detecting apparatus according to supplemental note 1, wherein the data registering section further calculates a plurality of table sets based on the plurality of search target data, and wherein the searching section refers to the plurality of tables to calculate the candidate data list, when one of the plurality of table sets shown by the search condition shows the plurality of tables.

<Supplemental Note 3>

The similarity detecting apparatus according to supplemental notes 1 or 2, wherein the plurality of directional parameters are set such that two values that are respectively calculated by two similar state change similar data of the plurality of search target data into the optional key calculation function are equal to each other, or a difference between the two values is smaller than a predetermined value.

<Supplemental Note 4>

The similarity detecting apparatus according to any of supplemental notes 1 to 3, wherein each of the plurality of search target data shows an image.

<Supplemental Note 5>

The similarity detecting apparatus according to any of supplemental notes 1 to 4, wherein the data registering section updates the plurality of tables, when the plurality of search target data are updated.

<Supplemental Note 6>

A directional nearest neighbor detecting method including:

a step of calculating a plurality of random number data based on a plurality of directional parameters and a plurality of intensity parameters which are inputted through an input unit;

a step of calculating a plurality of key calculation functions based on the plurality of random number data;

a step of calculating a plurality of tables corresponding to the plurality of key calculation functions based on a plurality of search target data inputted through the input unit;

a step of storing the plurality of tables in a table holding unit;

a step of referring to the plurality of tables to calculate a candidate data list based on a query shown by a search condition inputted through the input unit;

a step of calculating a search resultant data from a plurality of search data belonging to the candidate data list so as to satisfy a condition shown by the search condition;

a step of outputting the search resultant data to an output unit; and a step of relating a plurality of keys to a plurality of data lists, when calculating one of the plurality of tables corresponding to an optional key calculation function, and calculating the table such that a value calculated by substituting data belonging to one of the plurality of data lists corresponding to an optional key into an optional key calculation function for the optional key is equal to the optional key, wherein the candidate data list includes a plurality of search data lists corresponding to the plurality of key calculation functions, and wherein one of the plurality of search data lists corresponding to the optional key calculation function shows one of the plurality of data lists corresponding to a query value calculated by substituting the query into the key calculation function.

<Supplemental Note 7>

The directional nearest neighbor detecting method according to supplemental note 6, further including:

a step of calculating a plurality of table sets based on the plurality of search target data; and a step of referring to the plurality of tables to calculate the candidate data list, when one of the plurality of table sets shown by the search condition shows the plurality of tables.

<Supplemental Note 8>

The directional nearest neighbor detecting method according to supplemental note 6 or 7, wherein the plurality of directional parameters are set such that two values respectively calculated by substituting two similar state change similar data of the plurality of search target data into the optional key calculation function are equal to each other, or a difference between the two values is smaller than a predetermined value.

<Supplemental Note 9>

The directional nearest neighbor detecting method according to any of supplemental notes 6 to 8, wherein each of the plurality of search target data shows an image.

<Supplemental Note 10>

The directional nearest neighbor detecting method according to any of supplemental notes 6 to 9, further including a step of updating the plurality of tables when the plurality of search target data are updated.

<Supplemental Note 11>

A similarity detecting apparatus for detecting similar data from enormous search target data at a high speed based on an optional similarity criterion, wherein the similarity detecting apparatus holds a table that is related to random number data generated based on a parameter to set the similarity criterion, and used to register and manage the search target data, and wherein the similarity detecting apparatus carries out a nearest neighbor detection by using the table based on the set similarity criterion in response to a nearest neighbor search request from an optional reference point, to output data determined to be in a nearest neighbor region.

<Supplemental Note 12>

The similarity detecting apparatus according to supplemental note 11, wherein the similarity detecting apparatus has a plurality of the different similarity criteria and has a plurality of the tables related to the plurality of similarity criteria, and manages the search target data in all of the tables in parallel.

<Supplemental Note 13>

The similarity detecting apparatus wherein the similarity criterion described in the supplemental note 11 is a set of combinations of an interest direction and an importance parameter of the direction.

<Supplemental Note 14>

The similarity detecting apparatus wherein as the search target data described in the supplemental note 11, a distance between two optional points is defined as a distance on an Euclidean space.

<Supplemental Note 15>

The similarity detecting apparatus according to supplemental note 12, wherein the similarity detecting apparatus inputs a search similarity criterion together with a search center in searching, and determines a nearest neighbor region to be outputted by using the nearest neighbor detection result in the plurality of tables and a relation between the similarity criterion parameter specified in each table and the search similarity criterion.

<Supplemental Note 16>

The similarity detecting apparatus, wherein the search target data according to supplemental note 11 or supplemental note 12 is not only data having a statically fixed value but also data having a dynamically updated value, and a registration state of the table is updated in response to the update of the value.

<Supplemental Note 17>

The similarity detecting apparatus, wherein the similarity detecting apparatus according to supplemental note 11 or supplemental note 12 groups data similar in a state change by using a similarity detection result using the table.

<Supplemental Note 18>

The similarity detecting apparatus, wherein the table according to supplemental note 11 is configured from a pair of a key and a value, and when an optional data is registered, the similarity detecting apparatus calculates a key for data to be registered, and manages the data by additionally registering on the data list corresponding to the corresponding value.

<Supplemental Note 19>

The similarity detecting apparatus, wherein the similarity criterion according to supplemental note 11 is that data having same keys or keys of a small difference have a high similarity.

It should be noted that the present application claims a priority based on Japan Patent Application No. JP 2011-219547, and the disclosure thereof is incorporated herein by reference.

The invention claimed is:

1. A similarity detecting system, comprising:
a processor; and
a memory coupled to the processor, wherein the memory stores instructions that cause the processor to:
retain a table related to random number data generated based on a parameter for setting a similarity criterion;
register and manage the search object data on the table;
carry out a similarity detection by using the table based on the similarity criterion in response to a nearest neighbor search request from an optional reference point, and output data detected to be a nearest neighborhood;
set a plurality of said different similarity criteria;
retain a plurality of said tables which are respectively related to said plurality of different similarity criteria; and
manage the search object data by the plurality of tables in parallel.

2. The similarity detecting system according to claim 1, wherein the instructions further cause the processor to:
make a set of a combination of a direction of interest and an importance parameter to the direction set the a similarity criterion.

3. The similarity detecting system according to claim 1, wherein the instructions further cause the processor to:
set data in which a distance between optional two points is defined as a distance on the Euclidean space, as the search object data.

4. The similarity detecting system according to claim 1, wherein the instructions further cause the processor to:
  input a search similarity criterion with a search center, and determine the nearest neighborhood to be outputted by using a nearest neighborhood detection result in the plurality of tables and a relation between a parameter of the similarity criterion specified in each of the plurality of tables and the search similarity criterion.

5. The similarity detecting system according to claim 1, wherein the instructions further cause the processor to:
  use data having a statically fixed value and data having a dynamically updated value as the search object data; and
  update a registration state in the table in response to an update of the value of the data used as the search object data.

6. The similarity detecting system according to claim 1, wherein the instructions further cause the processor to:
  group data similar in a state change by using the similarity detection result using the table.

7. The similarity detecting system according to claim 1, wherein the instructions further cause the processor to:
  configure the table from the combination of a key and a value, calculate the key for data to be registered by using the random number data in registration of optional data, and manage the data by additionally registering in data list for a corresponding value.

8. The similarity detecting system according to claim 1, wherein the instructions further cause the processor to:
  determine that data having same keys or slightly different keys have a high similarity.

9. A method of detecting a directional nearest neighbor which is executed by a similarity detecting apparatus, comprising:
  retaining a table related to random number data generated based on a parameter for setting a similarity criterion;
  registering and managing search object data on the table;
  carrying out a similarity detection based on the set similarity criterion by using the table in response to a nearest neighbor search request to output data which is determined to be in the nearest neighborhood;
  setting a plurality of different similarity criteria;
  retaining a plurality of tables which are respectively related to said plurality of different similarity criteria; and
  managing search object data by the plurality of tables in parallel.

* * * * *